United States Patent [19]

Ng et al.

[11] 4,025,766
[45] May 24, 1977

[54] INVENTORY RECORDATION SYSTEM AND PROCESSING

[75] Inventors: Joseph Sau-Ho Ng, Montebello; William S. Sommers, Pasadena, both of Calif.

[73] Assignee: Muscolino Inventory Service, Inc., Arcadia, Calif.

[22] Filed: Oct. 29, 1975

[21] Appl. No.: 626,770

[52] U.S. Cl. .............................. 235/152; 340/172.5
[51] Int. Cl.² ....................... G06K 7/14; G06F 7/02
[58] Field of Search ......... 235/150, 61.7 R, 61.7 B, 235/61.7 J, 61.11 A, 61.11 D, 61.11 E, 152; 346/74; 340/147, 149, 172.5; 445/1

[56] References Cited

UNITED STATES PATENTS

| | | | |
|---|---|---|---|
| 3,422,441 | 1/1969 | Chapsky | 346/74 |
| 3,823,388 | 7/1974 | Chadima, Jr. et al. | 340/172.5 |
| 3,876,863 | 4/1975 | Boone | 235/61.7 R |

OTHER PUBLICATIONS

Electronic Laboratories, Inc. – "System 900" – Oct., 1971.

Primary Examiner—Malcolm A. Morrison
Assistant Examiner—Errol A. Krass
Attorney, Agent, or Firm—William W. Haefliger

[57] ABSTRACT

A system for recording an inventory of articles, in an article storage area, comprises
- a. a platform sized to be attached to an inventory taker moving about the article storage area,
- b. instrumentation including an alphanumeric keyboard unit, calculator and display supported on the platform,
- c. a data recorder operatively connected with the keyboard unit, and means to support the recorder on the inventory taker, and
- d. the keyboard unit including alpha and numerical keyboards and arithmetic function keys, and there being circuitry including two additional keys the first of which is operable when manually selected to enable recordation by the recorder of the keyboard output and to disable the calculator connection to the recorder, and the second of which is operable when manually selected to interconnect the calculator and the recorder.

12 Claims, 10 Drawing Figures

FIELD UNIT

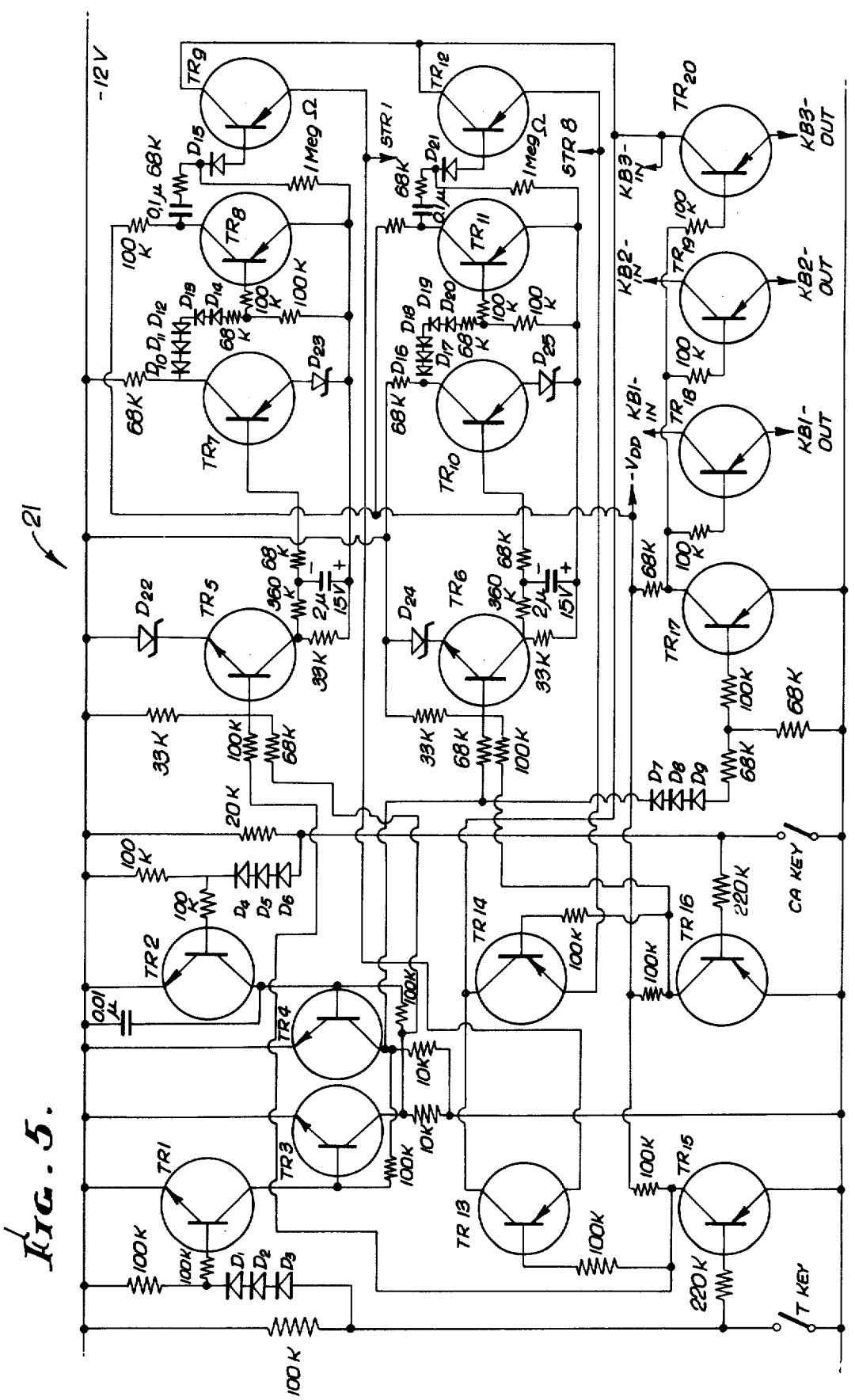

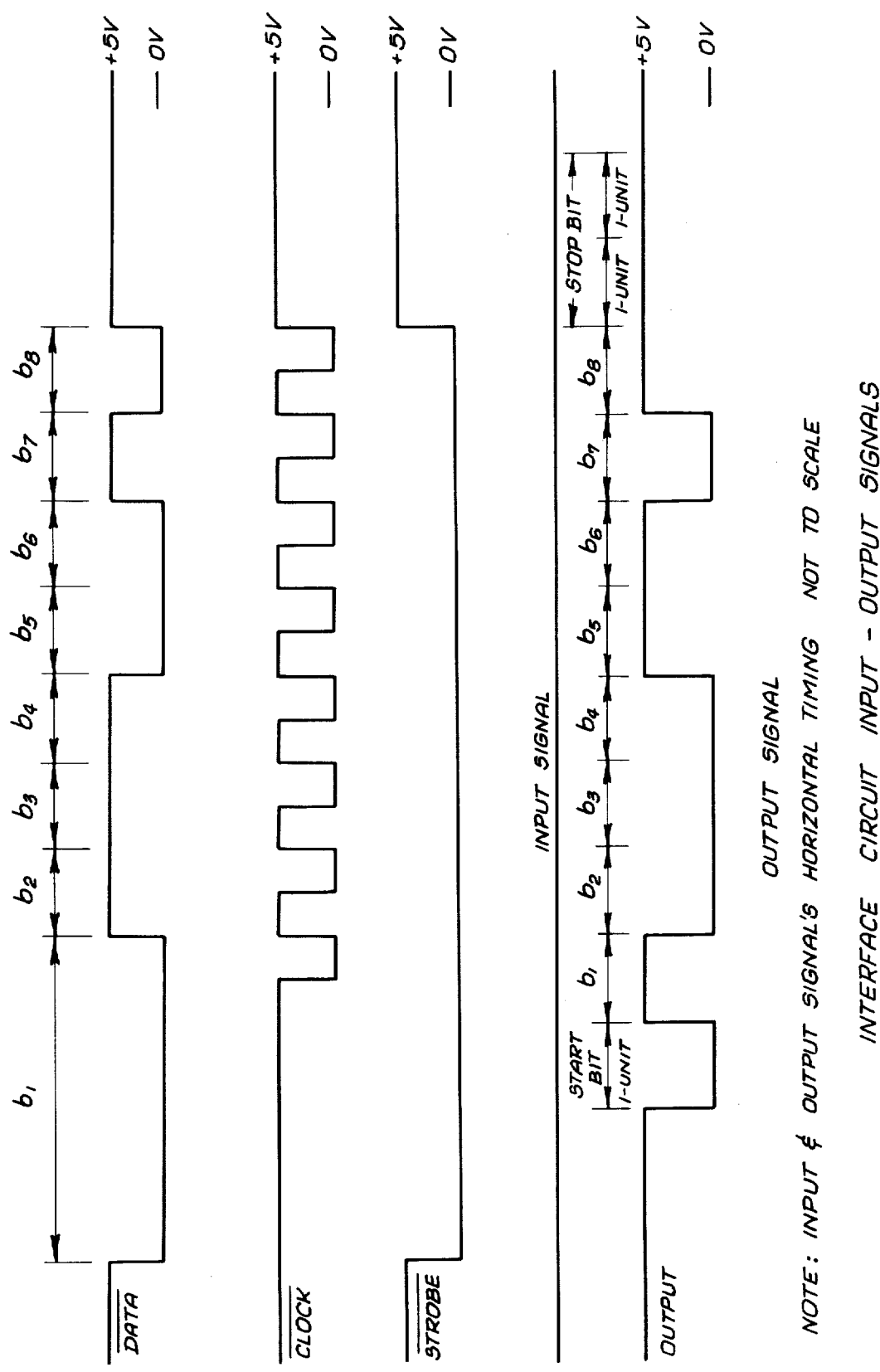

AUTOMATIC 12V. CHARGER

SOUND WARNING SYSTEM

INVENTORY RECORDATION SYSTEM AND PROCESSING

BACKGROUND OF THE INVENTION

This invention relates generally to inventory assessment procedures, and more particularly concerns method and system for taking and processing inventories in a rapid, efficient and accurate manner.

In the past, inventories and audits were accomplished primarily by manually written entries on appropriate forms of quantities of values of goods observed by the inventory taker, this procedure being excessively time consuming. Efforts have been made to increase the speed of such services as by recording voice transmitted numerical data onto magnetic tape for later playback and transcription onto suitable forms; however, this procedure is subject to unwanted error due to the uncertainty that the transcriber will accurately interpret or understand and transcribe all the voice enunciated numerical data on the tape being replayed.

SUMMARY OF THE INVENTION

It is a major object of the invention to provide solutions to the above as well as other problems and difficulties encountered in inventory taking. Basically, the new system for recording an inventory of articles in a storage area comprises:

a. a platform sized to be attached to an inventory taker moving about the article storage area, b. instrumentation including an alphanumeric keyboard unit, calculator and display supported on the platform, c. a data recorder operatively connected with the keyboard unit, and means to support the recorder on the inventory taker, and d. the keyboard unit including alpha and numerical keyboards and arithmetic function keys, and there being circuitry including two additional keys the first of which is operable when manually selected to enable recordation by the recorder of the keyboard output and to disable the calculator connection to the recorder, and the second of which is operable when manually selected to interconnect the calculator and the recorder.

Further, the first key is typically operable when selected to clear data from a memory register in the calculator, and to disable connection of the numerical keyboard to the calculator; also, the second key is operable when selected to clear data in the calculator, and to enable connection of the numerical keyboard to the calculator.

As will be seen, the recorder may include a magnetic tape cassette subsequently usable in conjunction with a tape player to operate a printer or other device such as a computer; a battery source of power for the calculator and data recorder may be separately suspended with the recorder by the inventory taker; and a training circuit may be connected with the keyboard to provide a sensory warning when two keys are simultaneously selected or pressed, as will be seen.

These and other objects and advantages of the invention, as well as the details of an illustrative embodiment, will be more fully understood from the following specification and drawings, in which:

DRAWING DESCRIPTION

FIG. 5 is a diagram of a circuit usable in the FIG. 3 system;

FIG. 7a is a timing diagram associated with the FIG. 7 circuit;

DETAILED DESCRIPTION

Figure 1:
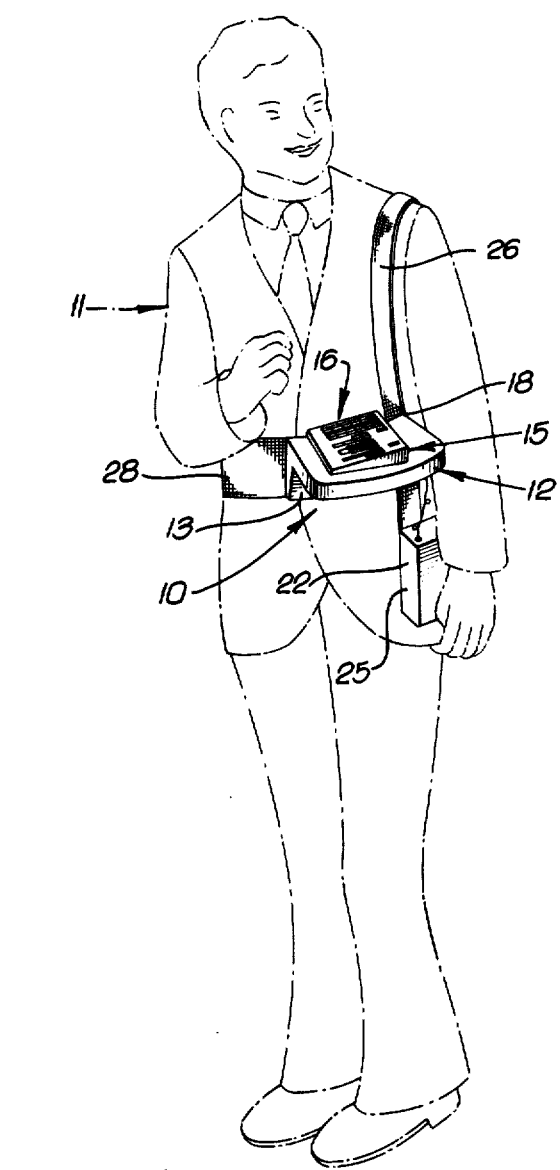
FIG. 1 is an elevation representing inventory taking, employing the invention.
Figure 2:
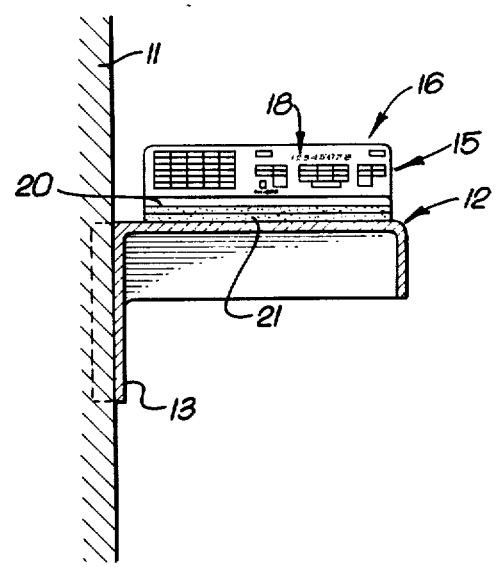
FIG. 2 is a vertical section through a platform as shown in FIG. 1.

Referring first to FIGS. 1 and 2, a platform 10 is sized to be attached to or carried by an inventory taker 11 moving about a storage area for articles to be inventoried. The platform includes a generally horizontal table portion 12 and a generally upright wall 13 concavely shaped to engage the side of the inventory taker's body for firm support, thereby to orient the table portion. The platform may be constructed as a unit, and for example may comprise molded glass fibers. A strap 28 may connect the table to the inventory taker.

An electronic data entry terminal is supported by the table portion 12, and includes a keyboard 16 operatively connected with a calculator. The visual display output of the latter is represented at 18 in FIGS. 1 and 3. The module 16 and calculator 15 may be integrated as a unit to be supported on the platform, (as for example on table portion 12) to be removable therefrom. As seen in FIG. 2, the interconnection to the table 12 is accomplished by means of VELCRO strips or layers 20 and 21 respectively attached to the module and table, and releasably interconnectible at their interface, as is known. Thus, the operator may adjust the position or orientation of the unit 15 on the platform to best suit his comfort and hand and arm positions, to enhance accuracy.

Figure 4:
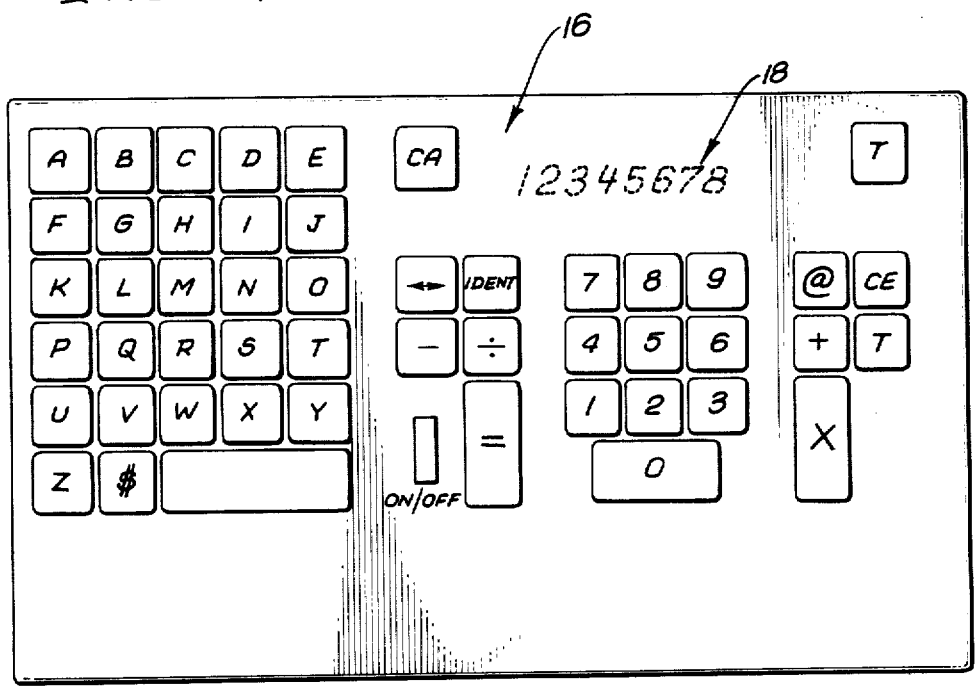
FIG. 4 is a representation of a keyboard module usable in the FIG. 3 system.

FIG. 4 shows one form of module 16, with alpha keys A-Z, a dollar key, keys for numerals 0-9, addition, subtraction, multiplication, division and equality, key C/E (clear entry), @ key, T and CA keys, identification key, and change sign ⟵⟶ key. An ON/OFF switch is also provided. The calculator itself may comprise a Sony or Sharp electronic calculator, for example.

Basically, the CA key, when selected or pressed, effects the following functions:

1. clears entry of key data into calculator;

2. clears data previously stored in calculator memory; (typically the function register, the calculator commonly has both a function register and a memory register).

3. ENABLES the numerical keyboard transmission to the calculator.

The T key, when pressed, effects the following functions:

4. ENABLES recordation of a TOTAL from the calculator at the recorder 22, which may for example include magnetic tape as in a cassette system;

5. clears the data in the memory register of the calculator;

6. DISABLES the numerical keyboard transmission to the calculator.

Figure 3:
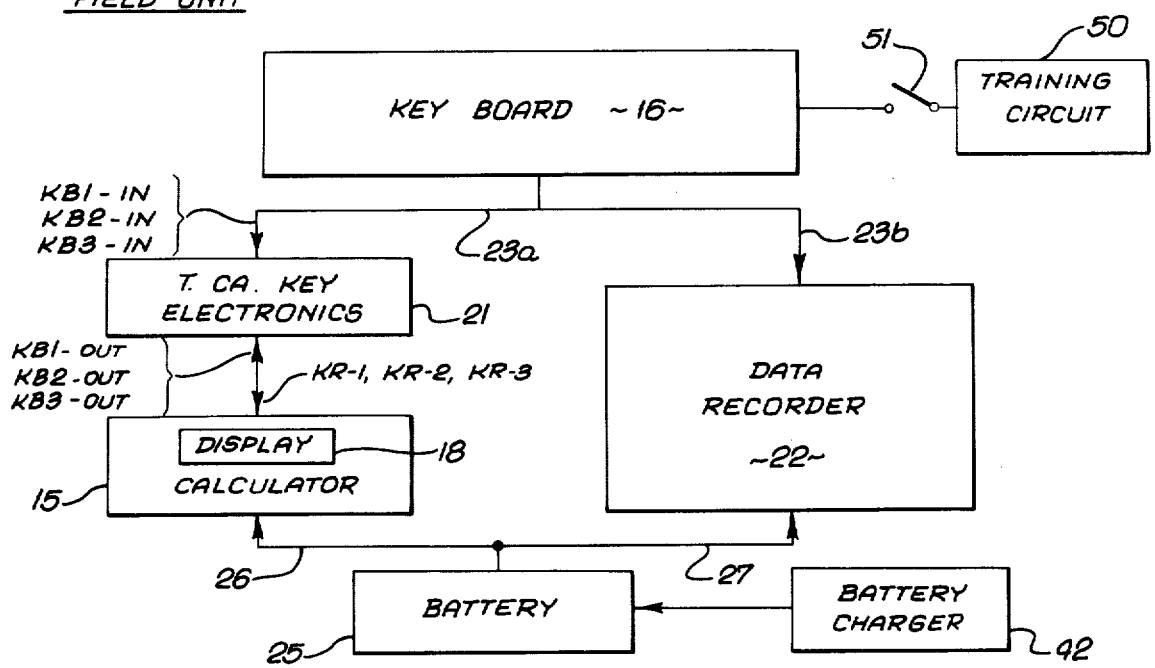
FIG. 3 is a block diagram of a data recordation system employing the invention.

More specifically, reference to FIG. 3 shows the T and CA key circuitry 21 connected between the keyboard 16 and the calculator 15, there being lines 23a and 23b respectively connecting the keyboard 16 to the circuitry 21 and to the data recorder 22. Such circuitry 21 (which may be incorporated in either of items 15 and 16 in FIG. 1) may include the transistors $T_1$–$T_{20}$ interconnected as shown in FIG. 5, there being inputs $KB_1$-IN, $KB_2$-IN and $KB_3$-IN from the keyboard, and outputs at $KB_1$-OUT, $KB_2$-OUT, and $KB_3$-OUT to the calculator.

The circuit 21 in FIG. 5 performs the series preprogram function when the T key or CA key is depressed. More specifically, when the T key is depressed, it will enable sending of the STR 1. signal or voltage via KB3-OUT to terminal KR 3 of the calculator, which will recall the calculator memory. At the same time, this operation will cut off the keyboard from the calculator even when the T key is released. The keyboard will then only activate the data recorder 22 via connection 23b in FIG. 3. For example, upon elapse of 0.5 second after the T key is released, the other 0.1 second long STR 8 signal will be transmitted to KR-3 and that will clear the calculator memory. At this time the keyboard will remain cut off from the calculator. All data entered to the keyboard will at this time activate only the data recorder, via connection 23b.

When the CA key is depressed, it will enable sending of the STR 8 signal via KB3-OUT to KR 3 of the calculator. This will clear the display 18. At the same time, the circuit will connect the calculator to keyboard via the three KB terminals and lines 23a and 23b. These three signals will stay on even when the CA key is released. Now the keyboard will activate the data recorder and the calculator together via lines 23a and 23b. Upon elapse of 0.5 second after the CA key is released, the other 0.1 second long STR 8 signal is transmitted to calculator terminal KR-3 to clear the whole calculator, and this time the keyboard will remain connected to the calculator. All data entered on the keyboard will then activate both the calculator and the data recorder via lines 23a and 23b. In addition, when power is turned on, the FIG. 5 circuit will automatically clear the whole calculator, and connect the KB1-IN, KB2-IN and KB3-IN terminals to the keyboard. Note connection of the battery 25 to the calculator via line 26 and to the data recorder via line 27. An encoder is typically incorporated with the data recorder, the encoder typically being a standard USASCII unit, as for example is produced by MSI Corporation, Costa Mesa, Calf., as Model 2000.

As a result of the foregoing, the selection of the T key initially enables recordation of data stored in the calculator, and subsequently enables the inventory taker to record data directly from the keyboard; whereas selection of the CA key enables the inventory taker to record not only data from the keyboard, but also to enter data from the keyboard into the calculator.

Figure 6:
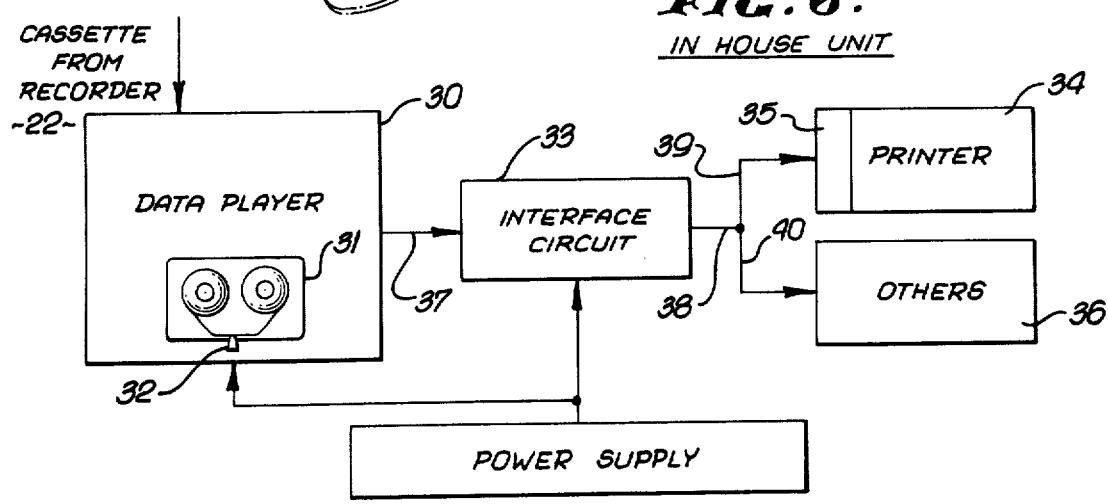
FIG. 6 is a block diagram of a data reduction system employing the invention.

Turning to FIG. 6, the in-house unit or system includes a data player, such as a cassette magnetic tape player 30, which may be operatively connected with the recorder 22 as via the tape cassette 31, there being a read head at 32. The output of the player is passed through an interface circuit 33 to either a printer 34 (via an associated decoder 35), or to a computer or other device indicated at 36. Connections are indicated at 37, 38, 39 and 40. A typical printer is Model 120 produced by General Electric Company, or Extel Model AH.

Figure 7:
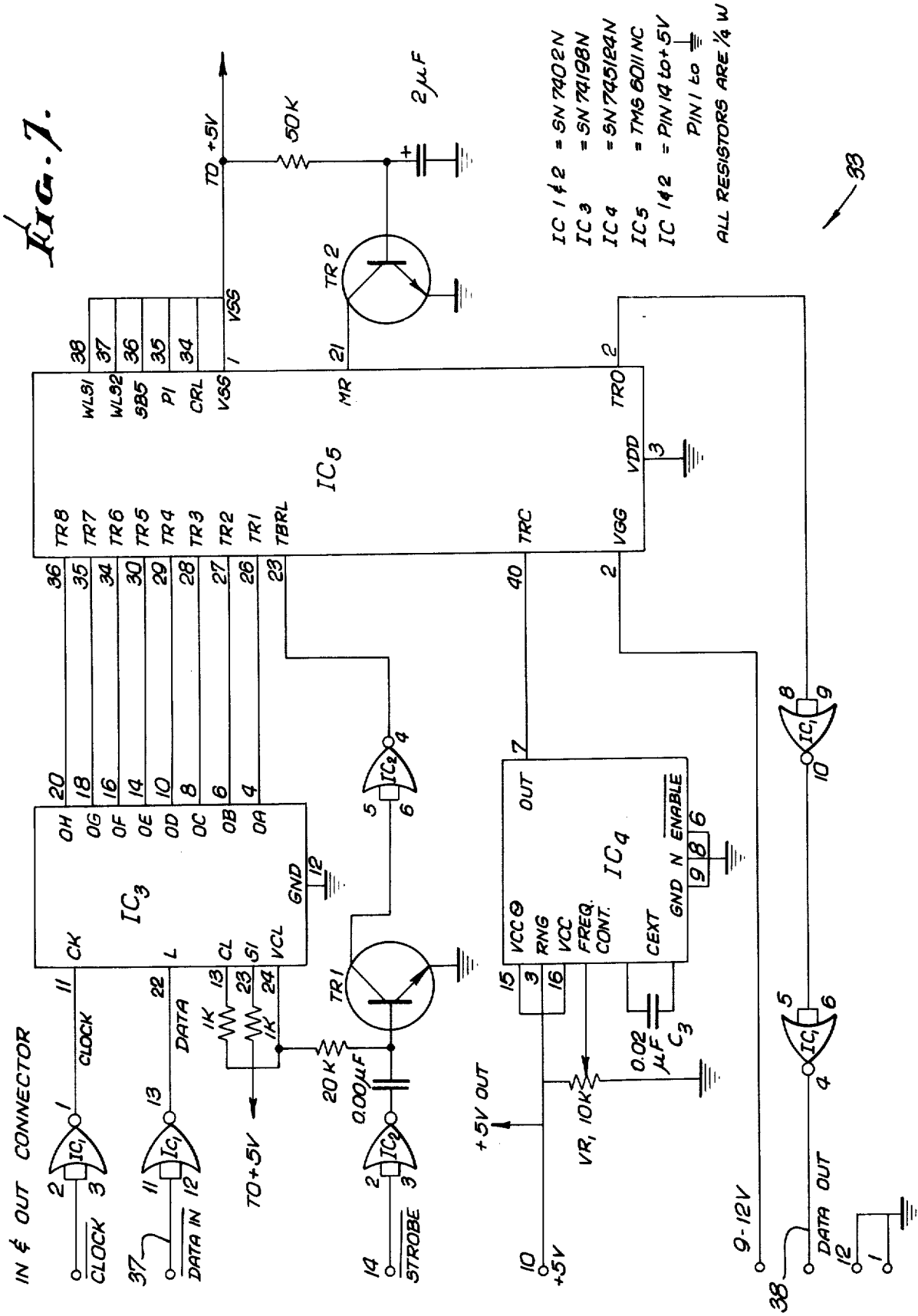
FIG. 7 is a diagram of a circuit usable in the FIG. 6 system.

The circuit 33, better shown in FIG. 7, is used to reform any uneven data Baud Rate, no-start bit, no-stop bit ASCII signal to an adjustable but even Baud Rate, and to generate a start bit and a selectable stop bit (single or double stop bit). The signal is identified as the Universal Asynchronous Receiver/Transmitter U.A.R.T. ASCII signal. The processing is accomplished by IC 1, IC 2, IC 3, IC 4, IC 5, and TR 1 connected as shown. The VR 1 Baud Rate can be adjusted from 500 to 1500, and more adjustment is possible by changing $C_3$.

The stop bit is selected by connecting the SBS pin No. 36 at IC 5 to 0 volts or +5 volts. If the SBS pin No. 36 is connected to the +5 volt supply, the result is a double stop bit. If the SBS pin is connected to the 0 volts supply, the result is a single stop bit.

The FIG. 7 circuit has an automatic power clear circuitry, i.e. when the power is turned on, the circuit will automatically reset all necessary circuitry, as is accomplished by operation of $TR_2$. FIG. 7a illustrates wave forms associated with the operation of the FIG. 7 interface or buffer circuitry.

A decoder is shown at 35 to decode the encoded ASCII data transmission for reception of decoded data by the printer. See FIG. 6 in this regard.

Figure 8:
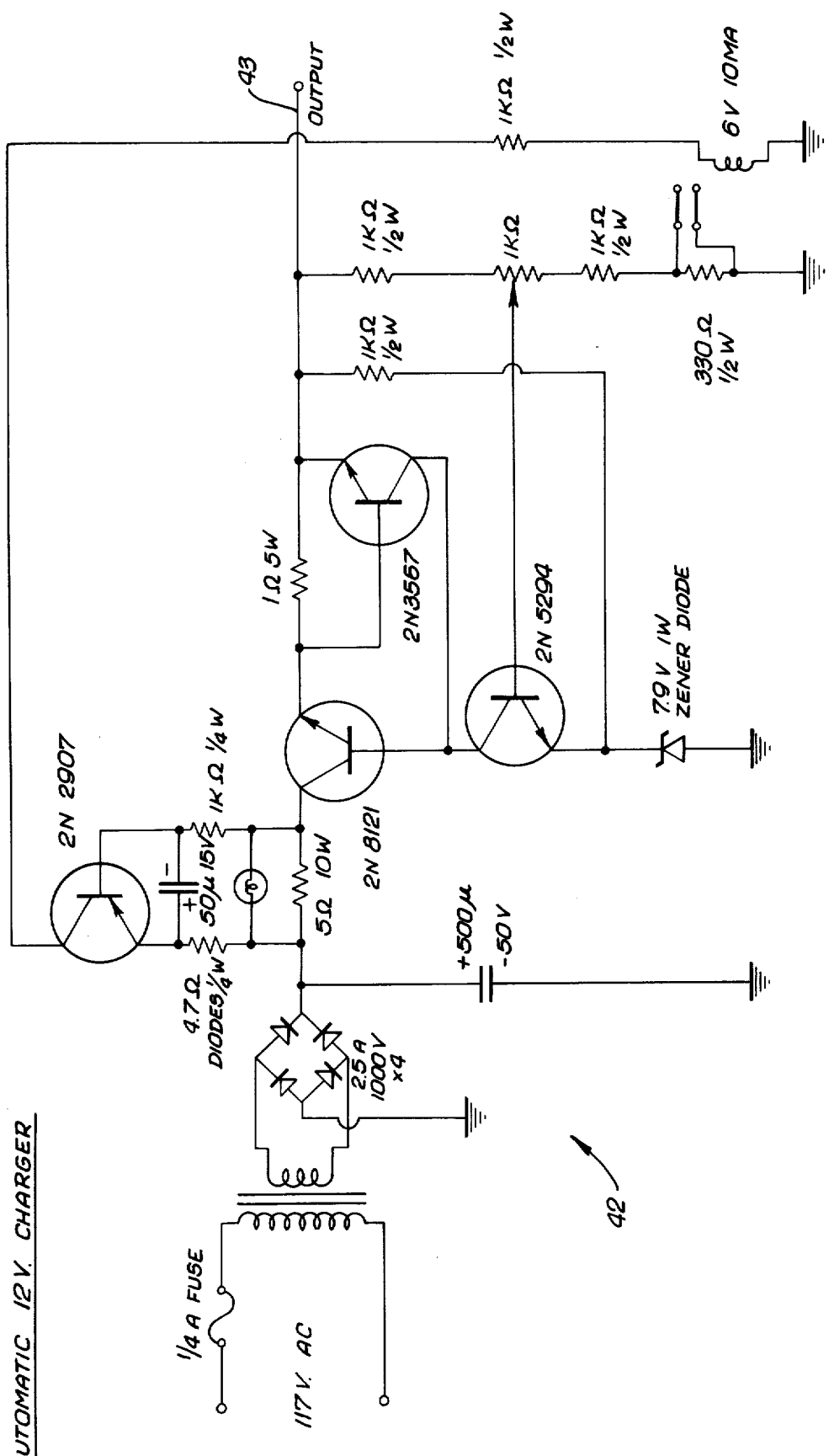
FIG. 8 is a charging circuit diagram.

FIG. 8 illustrates an automatic charging circuit 42 for the battery 25 in FIG. 1. The charger employs a dual voltage output, limited current system. When the battery voltage is low, the charger will produce a high voltage output at 43 (14.4 V) and the maximum charging current is limited at 0.7 A. When the battery is charged to 80 percent, the charging current drops to 100 MA., and charger will automatically switch to low voltage output (13.8 volt). In this mode the battery will gradually be fully charged, but will never be overcharged.

The battery 25 and recorder 22 may be integrated as in a carrier suspended as by a strap 26 from the shoulder as the inventory taker (see FIG. 1), i.e. independently of the support of the table 12.

Figure 9:
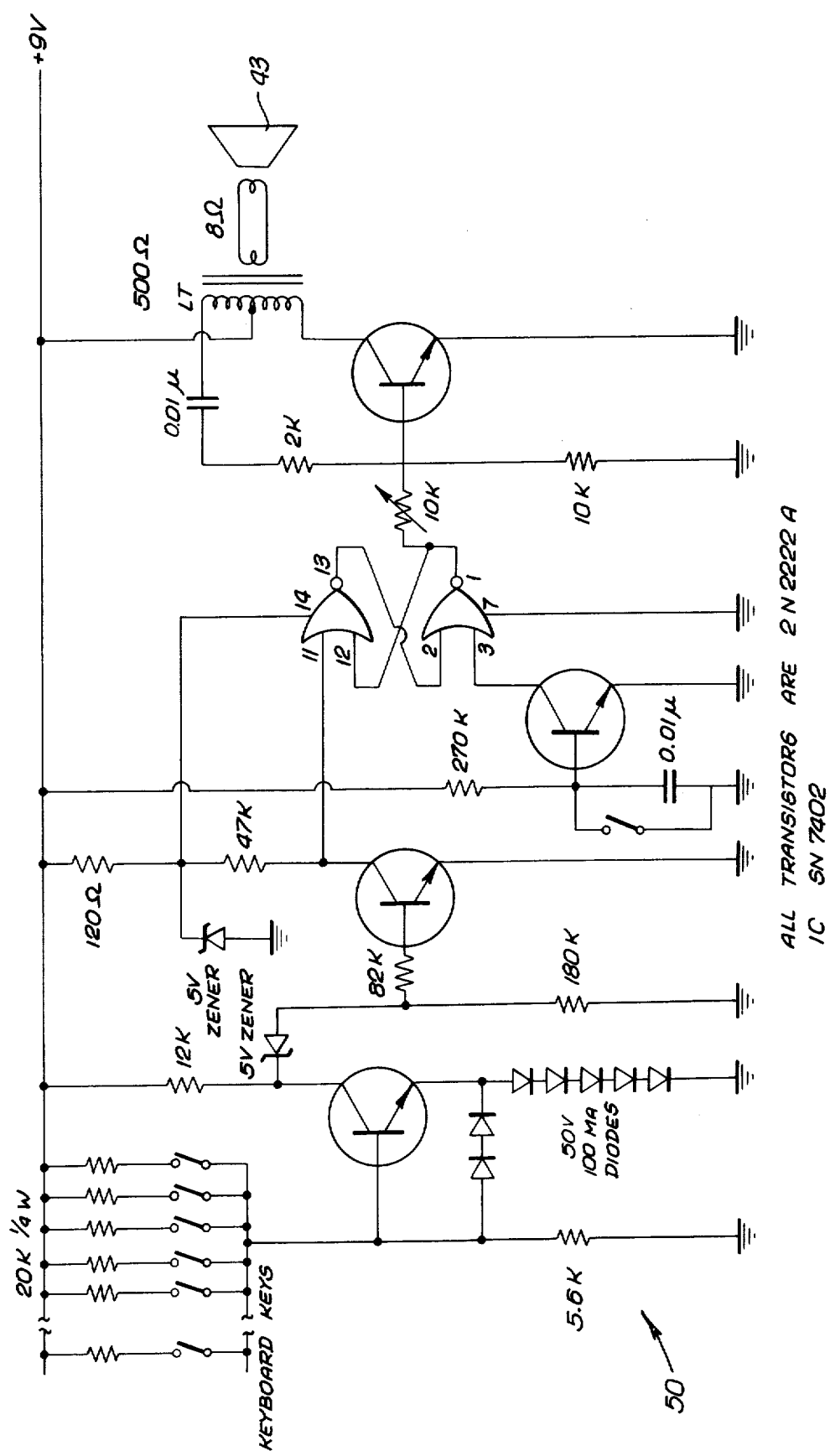
FIG. 9 is a training circuit diagram.

Finally, FIG. 9 illustrates a sound warning type training circuit 50 optionally connectible with the keyboard 16, as also seen in FIG. 3. Note switch 51 in FIG. 3, in this regard. When the operator depresses one key at a time of the set of alphanumeric keyboard keys, the warning system will have no function; however, if and when the operator depresses more than one key at the same time, the circuit will operate the speaker 43 to warn the operator. The tone will stay on even when keys are released. The tone will reset only when the operator depresses the clear key. Circuit 50 has an automatic power clear mode. When the power is turned on, the circuit will automatically reset the tone generator.

We claim:

1. In a system for recording an inventory of articles, in an article storage area, the combination comprising
   a. a platform sized to be attached to an inventory taker moving about the article storage area,
   b. instrumentation including an alphanumeric keyboard unit, calculator and display supported on the platform, c. a digital data recorder operatively connected to the keyboard unit, and means to support the recorder on the inventory taker, and d. the keyboard unit including alpha and numerical keyboards and arithmetic function keys, and there being circuitry including two additional keys the first of which is operable when manually selected to enable recordation by the recorder of the keyboard output and to disable the calculator connection to the recorder, and the second of which is operable when manually selected to interconnect the calculator and the recorder.

2. The combination of claim 1 wherein said recorder includes a magnetic tape cassette removable from the recorder.

3. The combination of claim 1 including a tape player operatively connected to the data recorder which is a tape recorder, a decoder connected to the output of the player, and a printer connected to the decoder output.

4. The combination of claim 3 including a computer connected to the output of the player.

5. The combination of claim 1 including an encoder operatively connected to the input of the recorder to encode alpha and numeric output from the keyboard and calculator and to provide a digital output to the recorder.

6. The combination of claim 1 including a battery source of power for the calculator and data recorder, and a charging circuit to automatically charge said battery.

7. The combination of claim 6 including a strap connected to the recorder to suspend the recorder from the inventory taker, the battery also carried by said strap.

8. The combination of claim 1 including a training circuit connected to the keyboard and having a sensory warning element activated when two keyboard keys are simultaneously selected by the inventory taker.

9. The combination of claim 1 including VELCRO strips on the platform upper side and on the lower side of said instrumentation, said strips being releasably joined to removably attach said instrumentation to the platform.

10. In a system for recording an inventory of articles, in an article storage area, the combination comprising a. a platform sized to be attached to an inventory taker moving about the article storage area, b. instrumentation including an alphanumeric keyboard unit, calculator and display supported on the platform, c. a digital data recorder operatively connected with the keyboard unit, and means to support the recorder on the inventory taker, d. the keyboard unit including alpha and numerical keyboards and arithmetic function keys, and there being circuitry including two additional keys the first of which is operable when manually selected to enable recordation by the recorder of the keyboard output and to disable the calculator connection to the recorder, and the second of which is operable when manually selected to interconnect the calculator and the recorder, e. an encoder operatively connected to the input of the recorder to encode alpha and numeric output from the keyboard and calculator and to provide a digital output to the recorder, and f. said first key also being operable when selected to clear data from a memory register in the calculator and to disable connection of the numerical keyboard to the calculator.

11. The combination of claim 10 wherein the calculator includes a function register, and the second key is also operable when selected to clear data in the calculator function register and to enable connection of the numerical keyboard to the calculator.

12. In a system for recording an inventory of articles, in an article storage area, the combination comprising a. a platform sized to be attached to an inventory taker moving about the article storage area, b. instrumentation including an alphanumeric keyboard unit, calculator and display supported on the platform, c. a data recorder operatively connected with the keyboard unit, and means to support the recorder on the inventory taker, d. the keyboard unit including alpha and numerical keyboards and arithmetic function keys, and there being circuitry including two additional keys the first of which is operable when manually selected to enable recordation by the recorder of the keyboard output to disable the calculator connection to the recorder, and the second of which is operable when manually selected to interconnect the calculator and the recorder, e. a tape player operatively connected to the data recorder which is a tape recorder, a decoder connected to the output of the player, and a printer connected to the decoder output, and including a buffer circuit connected between the player and printer to generate start and stop bits and an even Baud rate in response to data input from the player.

* * * * *